United States Patent [19]

Mitani

[11] 4,109,101

[45] Aug. 22, 1978

[54] CORRELATIVE CONVERTER BETWEEN A $2^n$-ARY CODE SEQUENCE AND A $2^{n+1}$-PHASE CARRIER PULSE SEQUENCE

[75] Inventor: Toshihiko Mitani, Tokyo, Japan

[73] Assignee: Nippon Electric Company, Ltd., Tokyo, Japan

[21] Appl. No.: 691,974

[22] Filed: Jun. 2, 1976

[30] Foreign Application Priority Data

Jun. 4, 1975 [JP] Japan ................... 50-67851

[51] Int. Cl.$^2$ ........................................... H04L 27/24
[52] U.S. Cl. ........................................... 178/67; 325/30
[58] Field of Search ................. 178/67; 325/30

[56] References Cited

U.S. PATENT DOCUMENTS

| 3,100,890 | 8/1963 | Henning | 178/67 |
|---|---|---|---|
| 3,485,949 | 12/1969 | DeHaas | 178/67 |
| 3,798,371 | 3/1974 | Melvin | 178/67 |

*Primary Examiner*—Richard Murray

*Attorney, Agent, or Firm*—Ostrolenk, Faber, Gerb & Soffen

[57] ABSTRACT

A novel modulator converts a sequence of N'ary codes representative of an element P of a set (0, 1, 2, . . . , N − 1) into a sequence of 2N-phase carrier pulses, where $N = 2^n$, $n$ being a positive integer. A phase shift in the carrier signal between each carrier pulse and the next preceding one is selected from $P\pi/N$ and $(P + N)\pi/N$ in compliance with a prescribed law of correlation between the N'ary codes in the sequence. Alternatively, the carrier signal is given in each carrier pulse a phase selected in the manner specified. For convenience of resorting to the prescribed correlation law, the N'ary code sequence may be converted into N trains, corresponding to the respective elements P, of three-level signals, 0 and ±1. In the train corresponding to a particular element, the three-level signals are successively produced with the prescribed correlation law, such as with resort to a bipolar or duobinary technique. A novel demodulator converts the 2N-phase carrier pulse sequence into the original N'ary code sequence.

10 Claims, 20 Drawing Figures

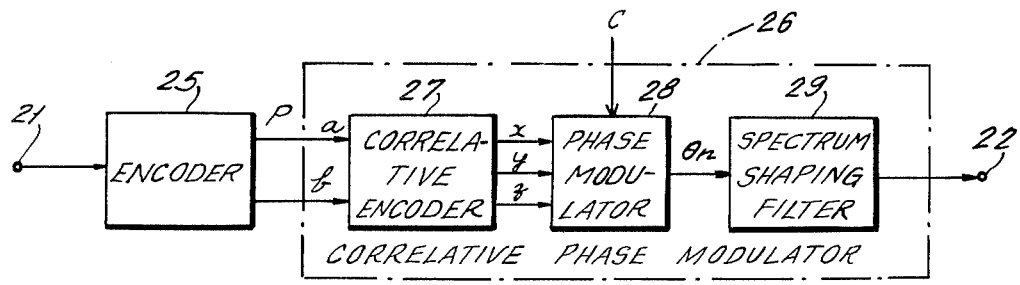
FIG. 1.
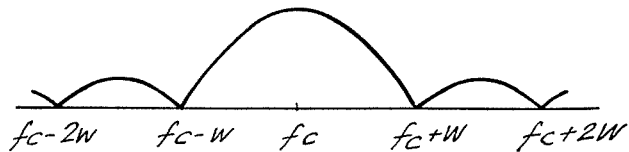
FIG. 2.
FIG. 3.
(PRIOR ART)
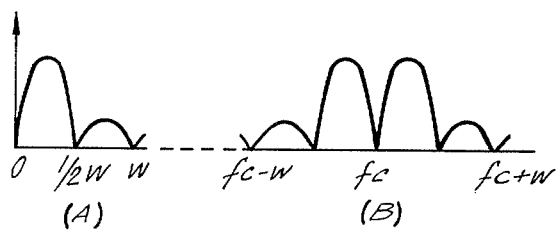
FIG. 4.
FIG. 5.
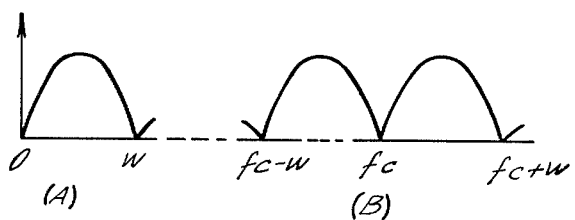
FIG. 6.

CORRELATIVE CONVERTER BETWEEN A $2^n$-ARY CODE SEQUENCE AND A $2^{n+1}$-PHASE CARRIER PULSE SEQUENCE

BACKGROUND OF THE INVENTION

This invention relates to a correlative digital modulator or demodulator for carrying out conversion between a sequence of N'ary codes and a sequence of 2N-phase carrier pulses, where N represents $2^n$ throughout the instant application, $n$ being a positive interger. By the use of a conventional converter between a sequence of information signals and an N'ary code sequence, this invention provides a modulator or a demodulator for effecting conversion between an information signal sequence and a 2N-phase carrier pulse sequence with a redundancy provided to make it possible to resort to an optional law of correlation between the information signals in the sequence.

A digital phase modulator for carrying out modulation according to phase shift keying (PSK) is widely used in transmitting digital signals through a communication channel of a band-pass type, such as a radio channel, wherein use is made of carrier pulses having phases selected in compliance with the respective digital signals. A modulator for carrying out differential phase shift keying (DPSK) is also used wherein use is made of a phase shift of each carrier pulse from the next preceding one to transmit the digital signals. It is to be noted in these respects that the carrier pulses assume discrete phase angles arranged at equi-spaced intervals between 0 and $2\pi$, only one of the interval ends being included. More particularly, the simplest modulation is two-phase modulation wherein the phases or phase shifts are 0 and $\pi$ according as the binary codes are representative of "0" and "1," respectively. In four-phase modulation, the phase or phase shift is selected from $0, \pi/2, \pi$, and $3\pi/2$ according to each quaternary code whereby two bits are transmitted at each time slot or with each code symbol. In general, it is possible to transmit n bits with each code symbol by resorting to N-phase modulation wherein use is made of N phases for N'ary codes. With such a polyphase modulator for N-phase modulation, a symbol rate W is given in symbols per second by:

$$W = F/\log_2 N,$$

where F represents the transmission rate in bits per second.

It is also known, as will be described hereunder with reference to one of the accompanying figures, that the spectral power density of the N-phase carrier pulse sequence is symmetric with respect to a carrier frequency $f_c$ and has zeroes at frequencies $f_c \pm nW$. Inasmuch as the principal side-band energy falls in a frequency interval between $f_c - W$ and $f_c + W$, it is readily possible, by suppressing the energy in other frequency bands as undesired side-bands, to permit the band between $f_c - W$ and $f_c + W$ to carry more than 99% of the effective power transmission. Consequently, the N-phase modulator provides a transmission efficiency $\eta$ given by:

$$\eta = F/(2W) = (\log_2 N)/2$$

in bits per Hertz in an occupied bandwidth of 2W Hz. When N is equal to 2, 4, 8, and 16, the transmission efficiencies are 0.5, 1, 1.5, and 2 bit/Hz, respectively. Although it is theoretically possible to further raise the transmission efficiency by restricting the occupied bandwidth to a frequency interval narrower than 2W either with shaped carrier pulses or by the use of an undesired side-band suppression filter for shaping the power spectrum, the raise in the efficiency is not feasible in practice due to an intolerable increase in intersymbol interference. It is also possible to further raise the efficiency by increasing the number of phases. This, however, is also impractical because the consequent decrease in the phase difference, namely, the space between two adjacent signal levels, results in a considerable reduction in tolerance for noise signals. It is thus very difficult, if not impossible, to achieve a transmission efficiency higher than 2 bits/Hz.

On the other hand, a quaternary partial response orthogonal amplitude modulator is known wherein a pair of orthogonal carrier signals are modulated independently by two trains of binary three-level digital baseband signals obtained by resorting to a concept known in baseband digital transmission techniques as binary three-level partial response techniques. With this modulator, the spectrum density of the modulated signal decreases to zero at $f_c \pm W/2$ so that it is readily possible to reduce the occupied bandwidth to W with the energy suppressed as undesired side-bands at frequencies on both sides of the $f_c \pm W/2$ band and consequently to attain a transmission efficiency of 2 bits/Hz. The modulator, however, is defective in respect of the adaptability thereof to radio transmission because rigorous linearity is thereby required to the transmission system.

Correlative digital communication techniques are also known wherein correlative encoding is resorted to in order to raise the transmission efficiency. Such techniques are disclosed by Adam Lender in IEEE Trans. on Communication and Electronics, Volume 82, pages 214-218 (May 1963), under the title of "The Duobinary Technique for High-Speed Data Transmission," and in IEEE Trans. on Communication Technology, Volume COM-12, pages 128-135 (December 1964), under the title of "Correlative Digital Communication Techniques." With these techniques, it is readily possible to detect code errors on the receiving side.

SUMMARY OF THE INVENTION

It is therefore an object of the present invention to provide a correlative digital modulator or demodulator of the type specified at the outset of the instant specification, whereby it is practical to raise the transmission efficiency above 2 bits/Hz.

It is a subordinate object of this invention to provide a correlative digital modulator or demodulator of the type specified, whereby code errors are readily detected on the receiving side.

With a correlative digital modulator according to an aspect of this invention, it is possible to reduce the spectral power density of a polyphase carrier pulse sequence produced thereby substantially to zero at the carrier frequency to render it feasible to transmit a pilot signal giving a reference to the carrier signal.

According to this invention, there is provided a converter, namely, a modulator or a demodulator, which comprises first and second means and carries out conversion between a sequence of information signals and a sequence of 2N-phase carrier pulses where $N = 2^n$, $n$ being a positive interger. The first means effects conversion between the sequence of information signals and a sequence of N'ary codes in a conventional manner, the former sequence corresponding to the latter sequence.

Each N'ary code represents an element P of a set (0, 1, 2, . . ., N - 1). The second means effects correlative conversion between the N'ary codes and the 2N-phase carrier pulses, which are assigned with phases, 2N in number, arranged in equi-spaced fashion in an interval between 0 and $2\pi$, only one of 0 and $2\pi$ being included in said interval. Each 2N-phase carrier pulse is given one of the phase and a shift in phase as compared with a 2N-phase carrier pulse next preceding the said each carrier pulse in the sequence that is selected from $P\pi/N$ and $(P + N) \pi/N$ in compliance with a prescribed law of correlation between N'ary codes in the sequence when P represents predetermined at least one element of the set. When P does not represent the predetermined at least one element, each 2N-phase carrier pulse is provided with the above-mentioned one of the phase and the phase shift that is equal to a preselected one of $P\pi/N$ and $(P + N)\pi/N$. It would readily be understood that the second means is a novel correlative $2^n$-ary $2^{n+1}$-phase modulator or demodulator and that the phase or the phase shift of none of the 2N-phase carrier pulses is rendered equal to the preselected one of $P\pi/N$ and $(P + N)\pi/N$ when the phase or phase shift of each of all 2N-phase carrier pulses is selected from $P\pi/N$ and $(P + N)\pi/N$ in compliance with the prescribed correlation law.

BRIEF DESCRIPTION OF THE DRAWINGS

FIG. 1 is a block diagram of a phase modulator comprising, in accordance with a first embodiment of the present invention, a correlative quaternary eight-phase modulator;

FIG. 2 shows phases of eight-phase carrier pulses of a sequence produced by a phase modulator according to the first embodiment;

FIG. 3 schematically illustrates a power spectrum of a conventional sequence of polyphase carrier pulses;

FIG. 4 schematically illustrates at (A) a power spectrum of a sequence of baseband three-level signals derived from a quaternary code sequence by resorting to Class 1 partial response technique and at (B) a power spectrum of a polyphase carrier pulse sequence derived from the three-level signal sequence;

FIG. 5 similarly illustrates at (A) a power spectrum of a three-level signal sequence derived by resorting to Class IV partial response technique and at (B) a power spectrum of a polyphase carrier pulse sequence derived from the last-mentioned three-level signal sequence;

FIG. 6 likewise illustrates at (A) a power spectrum of a three-level signal sequence derived by resorting to a bipolar code technique and at (B) a power spectrum of a polyphase carrier pulse sequence derived from the three-level signal sequence of the bipolar type;

DESCRIPTION OF THE PREFERRED EMBODIMENTS

Figure 7:
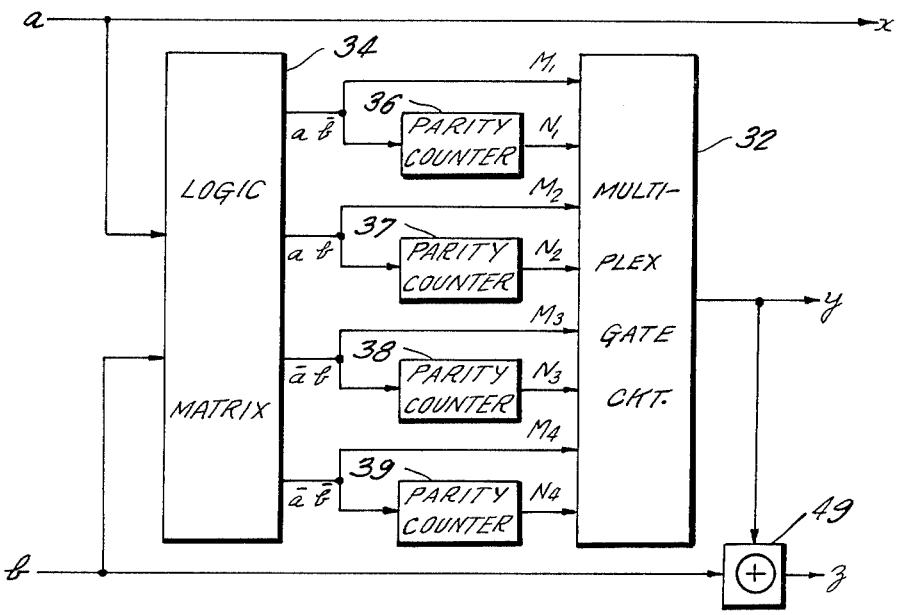
FIG. 7 is a block diagram of a correlative encoder used in a correlative quaternary eight-phase modulator for a phase modulator according to the first embodiment.
Figure 8:
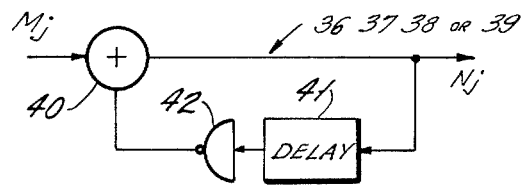
FIG. 8 is a block diagram of a parity counter used in the correlative encoder shown in FIG. 7 for carrying the Class I partial response technique into effect FI. 9 is a block diagram of a parity counter used in the correlative encoder depicted in FIG. 7 for carrying out the Class IV partial response technique.
Figure 9:
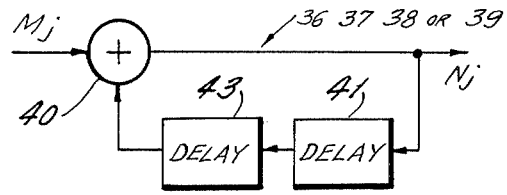
Figure 10:
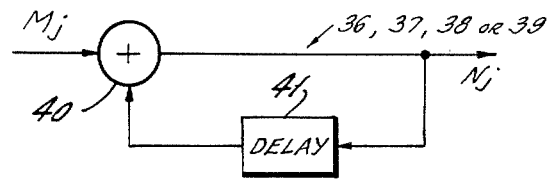
FIG. 10 is a block diagram of a parity counter used in the correlative encoder depicted in FIG. 7 for resorting to the bipolar code technique.
Figure 11:
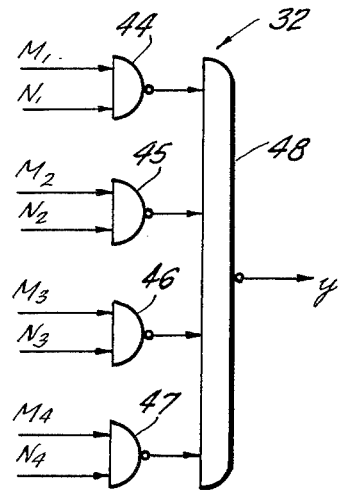
FIG. 11 shows the logic circuit of a multiple gate circuit used in the correlative encoder illustrated in FIG. 7.

Referring to FIGS. 1 and 2, a phase modulator according to a first embodiment of the instant invention comprises an input terminal 21 for a sequence of information signals, an output terminal 22 for a sequence of eight-phase carrier pulses, and an encoder 25 responsive to the information signal sequence for producing a sequence of quaternary codes. The quaternary code represents one of the quaternary numbers, 0, 1, 2, and 3 at any given instant. In other words, each of the quaternary codes represents an element P of a set (0, 1, 2, 3). As will readily be appreciated, the quaternary code sequence is given in practice by two trains of binary pulses $a$ and $b$ where combinations $(a, b)$, four in number, of every pair of the binary pulses $a$ and $b$ in the respective trains correspond to the quaternary codes. Inasmuch as use is made of a quaternary code sequence, it is possible with this phase modulator to transmit two bits with each code symbol. Such an encoder per se, known in the art, is outside the scope of this invention and consequently will not be described more in detail. The modulator further comprises a correlative quaternary eight-phase modulator 26 comprising, in turn, a correlative encoder 27, later described in detail, for converting the quaternary code sequence into a sequence of octernary codes in compliance with a prescribed law of correlation between each of the quaternary codes and other quaternary codes preceding in the sequence the said each quaternary code as will also be described later. The octernary code sequence is given in practice by three trains of binary pulses $x$, $y$, and $z$ where combinations (x, y, z), eight in number, of the binary pulses x, y, and z correspond to the octernary codes. The quaternary eight-phase modulator 26 further comprises a phase modulator 28 for eight-phase modulating a carrier signal c in response to the three binary pulse trains x, y and z to deliver the sequence of eight-phase carrier pulses to the output terminal 22. In the carrier pulse sequence, phases $\theta_k$ of the carrier signal c/occupy an interval between 0 and $2\pi$, only one of the interval ends 0 and $2\pi$ being included therein. As such; eight discrete angles $k \times \pi/4$, where K is selected from 0, 1, 2, ..., and 7, may be derived from the respective combinations (x, y, z) of the three-train binary trains x, y, and z.

It will now be understood that the quaternary code sequence is converted by the correlative quaternary eight-phase modulator 26 into an eight-phase carrier pulse sequence in accordance with a prescribed law of correlation. The three binary pulse trains x, y, and z are utilized to carry out this desired result. It should also be noted that the phase difference $\theta_k$ between successive output pulses $\theta_n$ is one of the eight angles $k \times \pi/4$. Consequently, the correspondence between the quaternary codes P and the phases $\theta_k$ or the phase shifts $\Delta\theta_k$ may be as exemplified in Table 1 below. From Table 1, it is seen that the correspondence is summarized as:

$$P \rightarrow \theta_k \text{ or } \Delta\theta_k,$$

where $k \equiv P \pmod 4$ and that the phase $\theta_k$ or phase shift $\Delta\theta_k$ of each output pulse $\theta_n$ is selected from a set of two angles $P\pi/4$ and $(P + 4)\pi/4$ in compliance with a prescribed correlation law.

TABLE 1

| P | $\theta_k$ or $\Delta\theta_k$ |
|---|---|
| 0 | $0 \times \pi/4$ and $4 \times \pi/4$ |
| 1 | $1 \times \pi/4$ and $5 \times \pi/4$ |
| 2 | $2 \times \pi/4$ and $6 \times \pi/4$ |
| 3 | $3 \times \pi/4$ and $7 \times \pi/4$ |

In order to facilitate an understanding of the manner of selection of the phase angle $\theta_k$ or phase shift $\Delta\theta_k$ in compliance with a prescribed law of correlation, it may be surmised here that the quaternary code sequence is converted into four trains A, B, C, and D of three-level signals of levels 0, +1, and −1, one three-level signal in each of the four trains corresponding to one three-level signal in each of the remaining trains. When the quaternary code P represents 0, the three-level signal in a first of the three-level signal trains A takes a level other than the 0 level as exemplified in Table 2 hereunder for an arbitrary quaternary code sequence while the corresponding signals in the other trains B to D take the 0 level. When the quaternary code P represents 1, 2, and 3, only one three-level signal in each of a second B, a third C, and a fourth D of the four trains assumes a level other than the 0 level. When the three-level signal assumes the levels +1 and −1, the angles (P + 4)$\pi/4$ and P$\pi/4$ are selected, respectively. With this surmise, the prescribed correlation law for selection of the phase $\theta_k$ or phase shift $\Delta\theta_k$ is reduced to a certain law for selection of the polarity +1 or −1 for the three-level signals. The "certain" law may be any one of the concepts of correlation known in the art of deriving a sequence of baseband three-level signals from a binary code sequence for transmission of the former and may be selected according to the bipolar code or the partial response (duobinary) techniques. For example, the polarities of the three-level signals are determined in compliance with the Class I partial response technique wherein the polarity +1 or −1 of a three-level signal of a level other than the 0 level in one of the four trains A to D is determined to be the same and opposite to that of another three-level signal of the +1 or −1 level next preceding in the same train the first mentioned three-level signal according to the number (zero inclusive) of the three-level signal or signals of the 0 level intervening therebetween is even and odd, respectively. The following Table 2, already mentioned hereinabove, shows a quaternary code sequence P, four three-level signal trains A to D correlated to the sequence P according to the Class I partial response, and phases $\theta_k$ or phase shifts $\Delta\theta_k$ of corresponding eight-phase carrier pulses.

TABLE 2

| P | A | B | C | D | $\theta_k$ or $\theta_k$ |
|---|---|---|---|---|---|
| 1 | 0 | +1 | 0 | 0 | $5 \times \pi/4$ |
| 2 | 0 | 0 | −1 | 0 | $2 \times \pi/4$ |
| 0 | +1 | 0 | 0 | 0 | $4 \times \pi/4$ |
| 0 | +1 | 0 | 0 | 0 | $4 \times \pi/4$ |
| 2 | 0 | 0 | −1 | 0 | $2 \times \pi/4$ |
| 0 | −1 | 0 | 0 | 0 | $0 \times \pi/4$ |
| 3 | 0 | 0 | 0 | −1 | $3 \times \pi/4$ |
| 3 | 0 | 0 | 0 | −1 | $3 \times \pi/4$ |
| 1 | 0 | −1 | 0 | 0 | $1 \times \pi/4$ |
| 0 | +1 | 0 | 0 | 0 | $4 \times \pi/4$ |
| 2 | 0 | 0 | +1 | 0 | $6 \times \pi/4$ |
| 3 | 0 | 0 | 0 | +1 | $7 \times \pi/4$ |
| 0 | +1 | 0 | 0 | 0 | $4 \times \pi/4$ |
| 2 | 0 | 0 | +1 | 0 | $6 \times \pi/4$ |
| 2 | 0 | 0 | +1 | 0 | $6 \times \pi/4$ |
| 1 | 0 | −1 | 0 | 0 | $1 \times \pi/4$ |
| 0 | −1 | 0 | 0 | 0 | $0 \times \pi/4$ |
| 1 | 0 | +1 | 0 | 0 | $5 \times \pi/4$ |
| 2 | 0 | 0 | −1 | 0 | $2 \times \pi/4$ |
| 3 | 0 | 0 | 0 | −1 | $3 \times \pi/4$ |
| 1 | 0 | +1 | 0 | 0 | $5 \times \pi/4$ |
| 3 | 0 | 0 | 0 | +1 | $7 \times \pi/4$ |
| 3 | 0 | 0 | 0 | −1 | $7 \times \pi/4$ |
| 2 | 0 | 0 | −1 | 0 | $2 \times \pi/4$ |
| 1 | 0 | −1 | 0 | 0 | $1 \times \pi/4$ |

Referring now to FIG. 3, it is also known in the art that the spectral power density W(f) of a baseband sequence of rectangular pulses is given by:

$$W(f) = W|(\sin\pi f/W)/(\pi f)|^2,$$

where f represents the baseband frequency. The spectral power density $W_c(f)$ of a sequence of polyphase carrier pulses derived by polyphase modulating a carrier signal by the rectangular pulse sequence is derived by transforming the spectral density W(f) of the baseband sequence from the baseband to the carrier band and is given by:

$$W_c(f) = W|[\sin\pi(f - f_c)/W]/[\pi(f - f_c)]|^2,$$

where $f_c$ represents the carrier frequency. The spectral power density $W_c(f)$ of the polyphase carrier pulse sequence has zeroes at frequencies $f_c \pm nW$ as has already been pointed out in the preamble of the instant specification.

Referring to FIGS. 4–6, the conversion of the quaternary code sequence into the four trains of three-level signals A to D according to the "certain" law of selection serves also to the study of spectral power density $W_c(f)$ of the sequence of eight-phase carrier pulses. If a subsequence of eight-phase carrier pulses is formed for each of the four trains A to D by assigning no carrier pulse, a carrier pulse of the phase (P + 4)$\pi/4$, and another carrier pulse of the phase P$\pi/4$ to the three-level signals of the levels 0, +1, and −1, respectively, the spectral power density of the subsequence is derived by the band transformation of the baseband spectral power density of the relevant one of the four trains A to D. Inasmuch as it is possible to deem the eight-phase carrier pulse sequence to result from a composition of the subsequences, the spectral density $W_c(f)$ of the eight-phase carrier pulse sequence results from a composition with the band transformed and with the phase considered, of the baseband spectral power densities of the respective three-level signal trains A to D and is similar to the spectral power density of each subsequence. The spectral power density $W(f)$ of a baseband three-level signal train is given by:

$$W(f) = W|G(f)|^2 Z/2,$$

wherein $G(f)$ represents the spectral amplitude density of a single pulse and is given for a rectangular pulse by:

$$G(f) = (\sin \pi f/W)/(\pi f),$$

and wherein $Z$ is given by:

$$Z = 2p(1 - p)(1 + \cos 2\pi f/w) \div [1 - 2(2p - 1) \cos 2\pi f/W + (2p - 1)^2]$$

for Class I partial response;

$$Z = 2p(1 - p)(1 - \cos 4\pi f/W) \div [1 - 2(2p - 1) \cos 4\pi f/W + (2P - 1)^2]$$

for Class IV partial response; and $$Z = 2p(1 - p)(1 - \cos 2\pi f/W) \div [1 - 2(1 - 2p)\cos 2\pi f/W + (1 - 2p)^2]$$

for bipolar, where, in turn, $p$ represents the probability of occurrence of signals of the +1 and -1 levels. Inasmuch as the probability P is equal to ¼ for the quaternary eight-phase modulation, the spectral power densities $W_c(f)$ of the eight-phase carrier pulse sequence are given by:

$$W_c(f) = W|G(f - f_c)|^2 Z,$$

with ¼ substituted for the probability p in the above-given three equations or the like for Z and with $f - f_c$ substituted for $f$ also therein. As best shown in FIG. 4 at (B), the spectral power density $W_c(f)$ for the Class I partial response has zeroes at frequencies $f_c \pm W/2$. For the Class IV partial response, the spectral power density $W_c(f)$ has zeroes at frequencies $f_c$ and $f_c \pm W/2$ as illustrated in FIG. 5 at (B). For mere suppression of the spectral density $W_c(f)$ at the carrier frequency $f_c$, the bipolar code technique is sufficient as illustrated in FIG. 6 at (B).

Referring again to FIGS. 1 and 2, the encoder 25 produces Gray codes $a$ and $b$ for the quaternary codes P as given below in two leftmost columns in Table 3. Responsive to the Gray codes $a$ and $b$, the correlative encoder 27 produces the aforementioned three trains of binary pulses $x$, $y$, and $z$ in the manner given in the two middle columns of Table 3. The two binary codes $a$ and $b$ are related to the three binary codes $x$, $y$, and $z$ by:

$$a = x$$

$$b = y \oplus z,$$

so that the possible combinations of two of the binary codes $y$ and $z$ of the three binary pulse trains for $b = 0$ and $b = 1$ may be (0, 0) or (1, 1) and (0, 1) or (1, 0), respectively, in compliance with the prescribed law of correlation. It will be understood that the combinations (0, 0, 0), and (0, 1, 1), and (0, 0, 1), . . . of the three binary codes $x$, $y$, and $z$ correspond to combinations (−1, 0, 0, 0, 0), or (1, 0, 0, 0), and (0, −1, 0, 0), (0, −1, 0, 0) or (0, −1, 0, 0) and (0, 0, −1, 0) or (0, 0, +1, 0) . . . , respectively, of the three level signals mentioned hereinabove and that the combinations $(x, y, z)$ correspond to the phases $\theta_k$ as indicated in the two rightmost columns of Table 3. The correlative quaternary eight-phase modulator 26 further comprises a spectrum shaping filter 29 for suppressing the undesired side-bands in the eight-phase carrier pulse sequence.

Table 3

| P | (a, b) | (x, y, z) | $\theta_k$ |
|---|--------|-----------|------------|
| 0 | (0, 0) | (0, 0, 0), (0, 1, 1) | 0 × π/4, 4 × π/4 |
| 1 | (0, 1) | (0, 0, 1), (0, 1, 0) | 1 × π/4, 5 × π/4 |
| 2 | (1, 1) | (1, 0, 1), (1, 1, 0) | 2 × π/4, 6 × π/4 |
| 3 | (1, 0) | (1, 1, 1), (1, 0, 0) | 3 × π/4, 7 × π/4 |

Referring to FIGS. 7 to 11, an example of the correlative encoders 27 for use in phase modulators according to the first embodiment comprises a connection 30 for transmitting the binary codes $a$ of the two binary code trains $a$ and $b$ as the binary codes $x$ of the three binary code trains $x$, $y$, and $z$ without any modification, a multiplex gate circuit 32 to be described later, and a known logic matrix 34 for separating the two trains of binary codes $a$ and $b$ into four trains M1, M2, M3, and M4 yielding the respective elements $a.b$, $a.b$, $a.b$, and $a.b$ of a quaternary code($a \cdot b$, $a \cdot b$, $a \cdot b$, $a \cdot b$) for each combination $(a,b)$ of the two-train binary codes $a$ and $b$. The four quaternary code trains M1 to M4 are supplied to the gate circuit 32. The correlative encoder 27 further comprises parity counters 36, 37, 38, and 39 responsive to the quaternary code trains M1 to M4 for counting the quaternary code elements $a \cdot b$, $a \cdot b$, etc. in compliance with the prescribed correlation law to supply four signal trains N1, N2, N3, and N4, respectively, to the gate circuit 32. For adoption of the Class I partial response technique, each of the parity counters 36 to 39 comprises an EXCLUSIVE OR gate 40 (FIG. 8) supplied with one of the four quaternary code trains Mj, a one-bit delay element 41 for delaying the output signal of the EXCLUSIVE OR gate 40, and an inverter 42 for inverting the polarity of the one-bit delayed signal to supply the polarity-inverted signal to the EXCLUSIVE OR gate 40. This parity counter counts the number of time slots where "0" codes are supplied thereto as relevant ones of the quaternary code elements $a \cdot b$, $a \cdot b$, $a \cdot b$ or $a \cdot b$ and produces the corresponding one of the four signal trains Nj wherein the polarities of the successive signals are determined accordingly as the numbers are even and odd. For the Class IV partial response (FIG. 9), each of the parity counters 36 to 39 comprises an EXCLUSIVE OR gate 40, a one-bit delay element 41, and another one-bit delay element 43 for providing a further delay of one bit to the one-bit delayed signal to supply a two-bit delayed signal back to the EXCLUSIVE OR gate 40. Each of the parity counters 36 to 39 for carrying out the bipolar code technique (FIG. 10) comprises an EXCLUSIVE OR gate 40 and a one-bit delay element 41 for supplying one-bit delayed output signal of the EXCLUSIVE OR gate 40 back thereto. This latter parity counter counts the "1" codes supplied thereto as pertinent ones of the quaternary code elements a.b̄, a.b., ā.b, or ā.b̄ and determines the polarities of the successive signals of the corresponding one of the four trains Nj accordingly as the numbers of the "1" codes are even and odd. The parity counter for the Class IV partial response carries out the determination according to the bipolar code technique independently with respect to every other time slot, namely, individually for the even and odd-numbered time slots.

The multiplex gate circuit 32 comprises four NAND gates 44, 45, 46 and 47 (FIG. 11) supplied with the corresponding combinations (M,N) of the signal trains M1–M4 and N1–N4, and a single NAND gate 48 supplied with the output signals of the four NAND gates 44 to produce the codes y of the three binary code trains x, y and z. It will be seen that the trains of the codes y is equivalent to a multiplexed signal sequence of the above-mentioned three-level signal trains A to D wherein binary codes "1" and "0" are substituted for three-level signals "+1" and "−1," respectively. The correlative encoder 27 still further comprises an EXCLUSIVE OR gate 49 responsive to the codes b of the two binary code trains a and b and the codes y of the three binary code trains x, y, and z for producing the codes z of the latter binary code trains x, y, and z.

Figure 12:
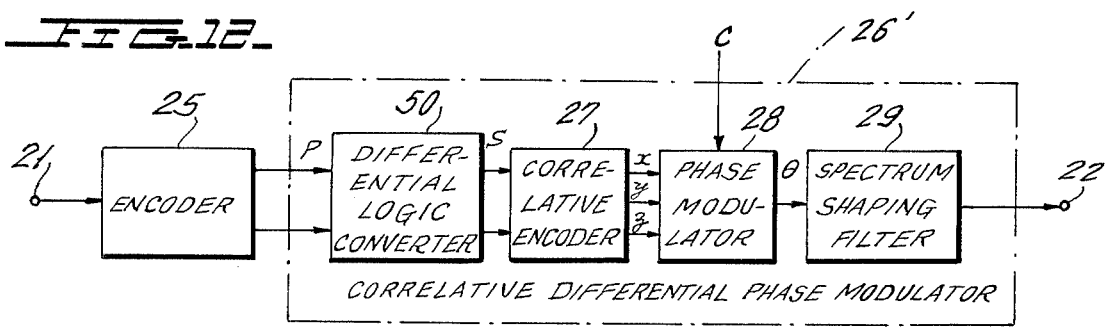
FIG. 12 is a block diagram of a differential phase modulator comprising a correlative quaternary eight-phase modulator in accordance with a modification of the first embodiment.
Figure 13:
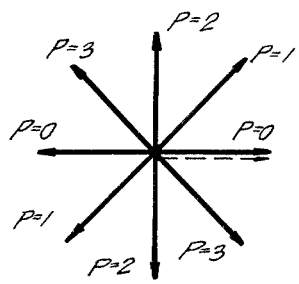
FIG. 13 shows phase shifts for eight-phase carrier pulses of a sequence produced by a differential phase modulator according to the modification of the first embodiment.

Referring now to FIGS. 12 and 13, a phase modulator according to a modification of the first embodiment comprises similar elements designated with like reference numerals as in FIG. 1 except that a correlative quaternary eight-phase differential modulator 26' is substituted for the correlative quaternary eight-phase straightforward modulator 26. In addition to the elements 27 to 29 described hereinabove, the differential modulator 26' comprises a known quaternary differential logic converter 50 between the encoder 25 and the correlative encoder 27 for converting the quaternary codes $P_i$ into quaternary differential codes $S_i$ in accordance with the relationship given by:

$$S_i = P_i + S_{i-1} \pmod 4,$$

where $i$ represents the numbers of the time slots. The eight-phase carrier pulses have phases $\theta_i$ related to the input quaternary codes $P_i$ by:

$$\Delta\theta_i = \theta_i - \theta_{i-1} = k_i \times \pi/4,$$

where $k_i \equiv P_i \pmod 4$. As best shown in FIG. 13, wherein arrows depicted with solid lines represent the phases $\theta_i$ assumed by eight-phase carrier pulses produced in response to the respective values 0, 1, 2, ..., and 7 of each input quaternary code $P_i$ and an arrow illustrated with a broken line indicates the phase $\theta_{i-1}$ of an eight-phase carrier pulse produced by an input quaternary code $P_{i-1}$ next preceding the said each quaternary code $P_i$ in the quaternary code sequence, and as will be seen from Table 4 given hereunder, the phase shifts $\Delta\theta_k$ of $P \times \pi/4$ and $(P + 4)\pi/4$ correspond to each input quaternary code P in compliance with the prescribed law of correlation.

Table 4

| P | Δθ |
|---|---|
| 0 | 0 × π/4, 4 × π/4 |
| 1 | 1 × π/4, 5 × π/4 |
| 2 | 2 × π/4, 6 × π/4 |
| 3 | 3 × π/4, 7 × π/4 |

Figure 14:
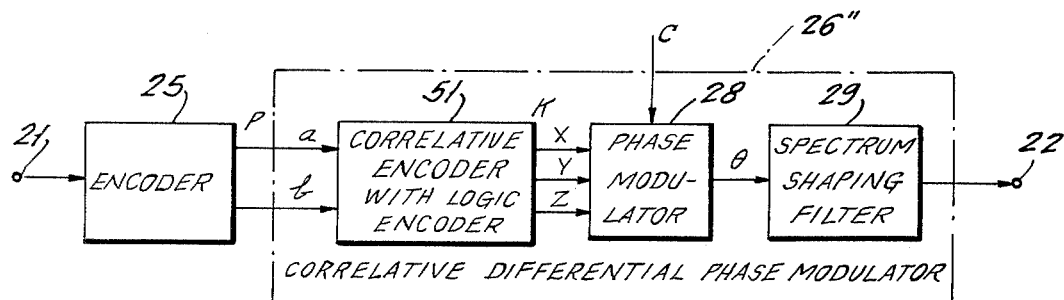
FIG. 14 is a block diagram of a differential phase modulator comprising in accordance with a second embodiment of this invention a correlative quaternary eight-phase modulator.
Figure 15:
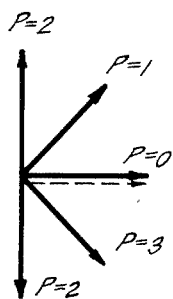
FIG. 15 shows phase shifts for eight-phase carrier pulses of a sequence produced by a differential phase modulator according to the second embodiment.
Figure 16:
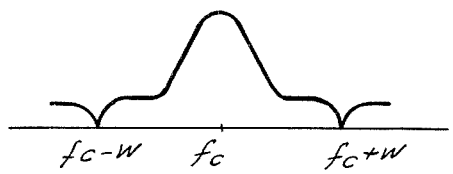
FIG. 16 schematically shows a power spectrum of a sequence of polyphase carrier pulses produced with a law of balanced selection adopted by a differential phase modulator according to the second embodiment.

Referring to FIGS. 14 to 16, a phase modulator according to a second embodiment of this invention is specifically adapted to correlative differential phase modulation and comprises similar elements designated with like reference numerals as in FIG. 1 except that another correlative quaternary eight-phase differential modulator 26'' is substituted for the correlative quaternary eight-phase straight modulator 26. Responsive to a sequence to quaternary codes P, the differential modulator 26'' produces a sequence of eight-phase carrier pulses having the phase shifts Δθ restricted to five values 0, ±π/4, and ±π/2 with two values P × π/4 and (P + 4)π/4 of phase shifts Δθ assigned only to a predetermined one of the values of the quaternary codes P and with a preselected one of the two values P × π/4 and (P + 4)π/4 given to each of the remaining values of the quaternary codes P as exemplified hereunder in Table 5 and best illustrated in FIG. 15 wherein the arrows are depicted in the manner described in conjunction with FIG. 13. One of the phase shifts Δθ is selected for the only one predetermined value of the quaternary codes P in compliance with a prescribed law of correlation between codes P of the quaternary code sequence. It is to be noted here that the phases θ of the carrier pulses take eight values according to various combinations of the phase shifts 0, ±π4, and ±π/2 and the phase θ of the next preceding carrier pulse. Restriction of the phase shifts Δθ to the five values, however, provides a large correlation coefficient to the eight-phase carrier pulse sequence such that the principal portions of the side-band energy in the spectral power density $W_c(f)$ for the eight-phase carrier pulse sequence is concentrated within a frequency band $f_c \pm$ W/2. The prescribed correlation law may be a law of balanced selection between the two phase shifts whereby the probabilities of occurrences of the phase shifts P × π/4 and (P + 4)π/4 are rendered equal to each other. In this event, the spectral power density $W_c(f)$ is given by:

$$W_c(f) = W|G(f - f_c)|^2 Z(f - f_c),$$

where:

$$Z(f) = (1 - R^2)/(1 - 2R\cos 2\pi f/W + R^2),$$

where, in turn, $R = (1 + \sqrt{2})/4$. The spectral density $W_c(f)$ is depicted in FIG. 16.

TABLE 5

| P | Δθ |
|---|---|
| 0 | 0 × π/4 |
| 1 | 1 × π/4 |
| 2 | 2 × π/4, 6 × π/4 |
| 3 | 7 × π/4 |

Figure 17:
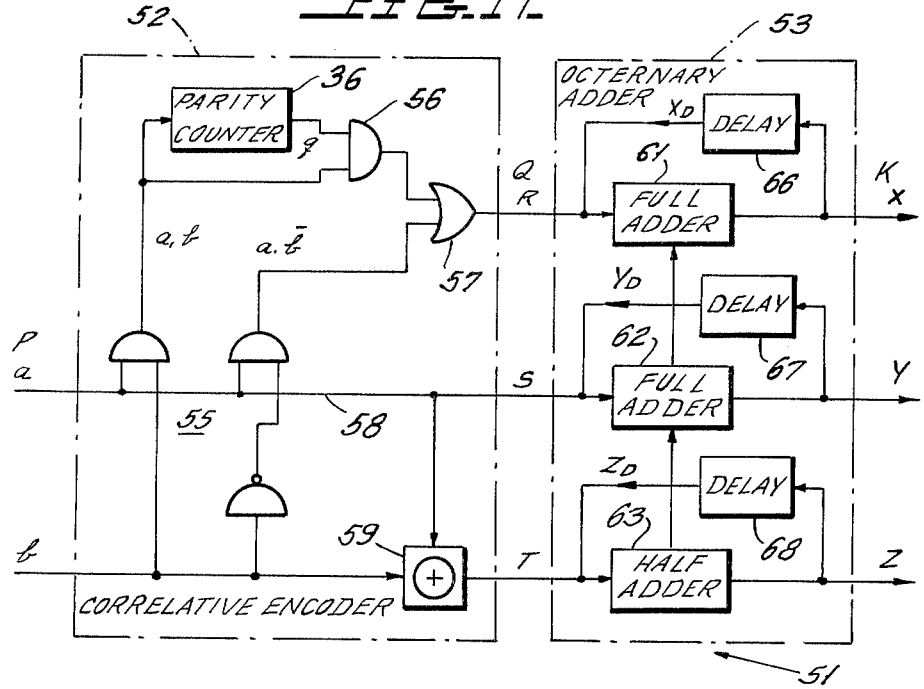
FIG. 17 is a block diagram of a correlative encoder with differential logic converter for use in a differential phase modulator according to the second embodiment.

Referring again to FIG. 14 and afresh to FIG. 17, the correlative quaternary eight-phase differential modulator 26'' comprises a correlative encoder with differential logic transformation or conversion 51 in place of the correlative encoder 27 of the correlative quaternay eight-phase straight encoder 26. The correlative encoder with differential logic conversion 51 comprises a constituent correlative encoder 52 and an octernary adder 53 and produces a sequence of octernary differential codes $K_i$ in response to a sequence of quaternary codes $P_i$ with the prescribed correlation law taken into account. The octernary differential codes K are given by all possible combinations (X,, Y, Z), eight in number, of binary codes X, Y, and Z of three "ultimate" trains. The binary codes X, Y, and Z are supplied to the eight-phase modulator 28 as in the correlative straight modulator 26. Responsive to the sequence of quaternary codes $P_i$ given by the Gray codes a and b, the constituent correlative encoder 52 produces an intermediate sequence of octernary codes $Q_i$ with the correlation law taken into account. When the octernary codes $Q_i$ are given by binary codes R, S, and T of three "intermediate" trains wherein the combinations (R, S, T), eight in number, represent the octernary codes $Q_i$ by natural octernary codes as shown below in Table 6, the prescribed correlation may also be as given in Table 6. In response to the intermediate sequence of octernary codes $Q_i$, the octernary adder 53 calculates the sequence of octernary differential codes $K_i$ as follows:

$$K_i = Q_i + K_{i-1} \pmod{8}.$$

TABLE 6

| P | (a, b) | Q | (R, S, T) |
|---|--------|---|-----------|
| 0 | (0, 0) | 0 | (0, 0, 0) |
| 1 | (0, 1) | 1 | (0, 0, 1) |
| 2 | (1, 1) | 2, 6 | (0, 1, 0), (1, 1, 0) |
| 3 | (1, 0) | 7 | (1, 1, 1) |

Referring more specifically to FIG. 17, it is to be pointed out at first that the prescribed correlation law exemplified hereinabove in Table 6 is expressed by the following logic equations:

$$R = a \cdot b + a \cdot \bar{b} \cdot q$$

$$S = a$$

$$T = a \oplus b \pmod{2},$$

where $q$ represents a single train of binary codes for rendering the binary codes R of a first of the three intermediate trains equal to 0 and 1 and for thereby giving the values 2 and 6 to the octernary codes of the intermediate sequence $Q_i$. The constituent correlative encoder 52 therefore comprises logic circuits 55 responsive to the binary codes $a$ and $b$ of the two trains for producing only two trains of quaternary codes $a \cdot b$ and $a \cdot \bar{b}$ among four trains of the whole quaternary codes, a parity counter 36 of the structure illustrated, for example, with reference to FIG. 8, responsive to the quaternary codes $a \cdot b$ of one of the only two trains for producing the binary codes $q$ of the single train, and AND gate 56 responsive to the quaternary codes $a \cdot \bar{b}$ of the other of the only two trains and the binary codes $q$ for producing the logic products $a \cdot \bar{b} \cdot q$, and an OR gate 57 for producing the logic sums $a \cdot b + a \cdot \bar{b} \cdot q$, namely, the binary codes R of the first of the three intermediate trains. The constituent correlative encoder 52 further comprises a connection 58 for producing the binary codes $a$ of the two trains as the binary codes S of the three trains without any modification, and an EXCLUSIVE OR gate 59 responsive to the binary codes $a$ and $b$ of the two trains for producing the binary codes T of the three trains. Alternatively, the quaternary codes $Q_i$ may be rendered equal to 2 and 6 when an input quaternary code $P_i$ is equal to 2 according as the phase $\theta_{i-1}$ of the carrier pulse for the next preceding quaternary code $P_{i-1}$ is an even and an odd integral multiple of $\pi/4$, namely, according as the octernary differential code $K_{i-1}$ is equal to an even and an odd integer, respectively. In this event, the binary codes $q$ of the single train are given by a signal $Z_D$ described hereunder. The octernary adder 53 comprises a first full adder 61, a second full adder 62, and a half adder 63. A first, a second, and a third one-bit delay element 66, 67, and 68 respectively give a delay of one bit to the output signals of the adders 61 to 63 to produce delayed signals $X_D$, $Y_D$, and $Z_D$. Responsive to the binary codes R, S, and T of the three intermediate trains and the delayed signals $X_D$, $Y_D$, and $Z_D$, the adders 61 to 63 produce the binary codes X, Y, and Z of the three ultimate trains as the octernary differential codes $K_i$.

Figure 18:
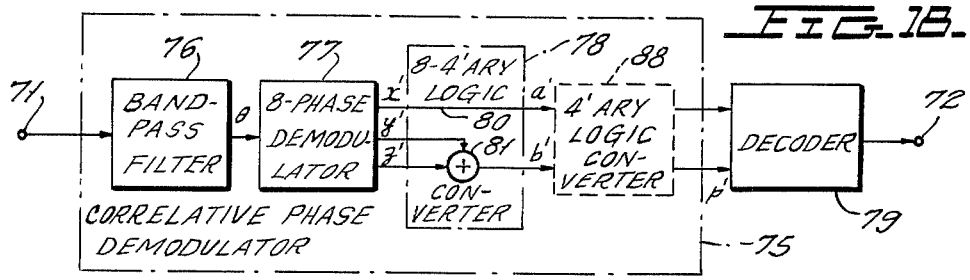
FIG. 18 illustrates, mostly in block form, a phase demodulator comprising, in accordance with a preferred embodiment of this invention, a correlative quaternary eight-phase demodulator.

Referring now to FIG. 18, a phase demodulator according to a preferred embodiment of this invention comprises an input terminal 71 for a sequence of eight-phase carrier pulses supplied from a phase modulator according to the first embodiment without the differential phase modulation, an output terminal 72 for a sequence of reproduced original information signals, and a correlative quaternary eight-phase demodulator 75 for converting the eight-phase carrier pulse sequence supplied from the input terminal 71 into a sequence of reproduced quaternary codes P'. The correlative quaternary eight-phase demodulator 75 comprises, in turn, a band-pass filter 76 for the eight-phase carrier pulse sequence, a conventional eight-phase demodulator 77 for demodulating the eight-phase carrier pulse sequence into three trains of binary codes $x'$, $y'$, and $z'$ which correspond to the binary codes $x$, $y$, and $z$ of the three-trains mentioned hereinabove, and a correlative decoder or logic converter 78 for converting the three-train binary codes $x'$, $y'$, and $z'$ into two trains of binary codes $a'$ and $b'$ representative of the reproduced quaternary codes P'. The phase demodulator further comprises a conventional decoder 79 responsive to the reproduced quaternary code sequence P' for producing the information signal sequence to supply the latter to the output terminal 72. The correlative decoder 78 comprises a through-connection 80 for producing the binary codes $x'$ of a first of the three trains as the binary codes $a'$ of a first of the two trains without any modification, and an EXCLUSIVE OR gate 81 responsive to the binary codes $y'$ and $z'$ of the remaining two of the three trains for producing the binary codes $b'$ of the other of the two trains.

Figure 19:
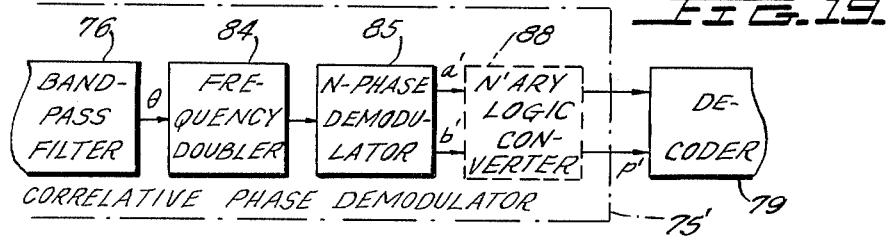
FIG. 19 is a partial block diagram of a phase demodulator according to another preferred embodiment of this invention.

Referring to FIG. 19, a phase demodulator according to yet another preferred embodiment of this invention is also for the eight-phase carrier pulse sequence produced by a phase modulator according to the first embodiment without the differential phase modulation. In place of the correlative quaternary eight-phase demodulator 75 among similar elements designated with like reference numerals as in FIG. 18, the phase demodulator according to the latter preferred embodiment comprises a correlative quaternary eight-phase demodulator 75' comprising, in turn, a frequency doubler 84 for multiplying by a factor of two the frequencies of the eight-phase carrier pulse sequence supplied from the band-pass filter 76 to produce a sequence of ordinary four-phase carrier pulse sequences without a loss of information, and a conventional four-phase demodulator 85 for demodulating the four-phase carrier pulse sequence into a sequence of reproduced quaternary codes P' represented by two trains of binary codes $a'$ and $b'$.

A phase demodulator according to a modification of each of the preferred embodiments thus far described is for a sequence of eight-phase carrier pulses supplied from a phase modulator according to the modification of the first embodiment. As depicted in each of FIGS. 18 and 19 with broken lines, the phase demodulator according to the modification comprises a conventional quaternary differential logic converter 88 between either the correlative encoder 78 or the four-phase demodulator 84 and the conventional decoder 79.

Figure 20:
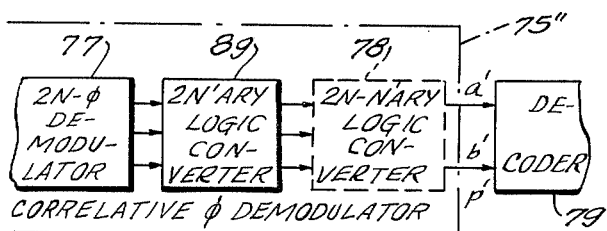
FIG. 20 is a fragmentary block diagram of a phase demodulator according to still another preferred embodiment of this invention.

Referring finally to FIG. 20, a phase demodulator according to still another preferred embodiment of this invention is for an eight-phase carrier pulse sequence supplied from a phase modulator according to the second embodiment. The phase demodulator according to this preferred embodiment comprises a correlative phase demodulator 75" in place of the correlative phase demodulator 75 illustrated with reference to FIG. 18. The correlative phase demodulator 75" comprises, in turn, a conventional octernary differential logic converter 89 between the eight-phase demodulator 77 and the octernary to quaternary logic converter 78 of the correlative phase demodulator 75.

It will now be appreciated that a correlative phase modulator 26, 26', or 26" or demodulator 75, 75', or 75" may generally be a correlative N'ary 2N-phase modulator or demodulator and that a converter for carrying out conversion between an information signal into a 2N-phase carrier pulse sequence by an intermediary of an N'ary code sequence according to this invention is capable of achieving the abovementioned objects although the number of phases of the polyphase carrier pulses is twice the number used in conventional polyphase modulation or demodulation and has the salient feature set forth in the preamble when either the Class IV partial response or the bipolar technique is resorted to for the prescribed correlation law. In addition, frequency doubling of the 2N-phase carrier pulse sequence supplied from a phase modulator according to the first embodiment produces a sequence of N'ary N-phase carrier pulses which is readily demodulated in a conventional manner.

Finally, it should be noted that the second embodiment is applicable only to differential phase modulation and demodulation because the phases of the polyphase carrier pulses would not otherwise amount to 2N, in number. Incidentally, it is not preferred in practice to select a number other than $2^n$ as the number N, to select the 2N phases in the aforesaid interval at unequal spaces rather than at an equal space of $\pi/N$, or to assign a pair of phases or phase shifts having a difference other than $\pi$ to each of the predetermined N'ary code or codes.

What is claimed is:

1. A correlative phase modulator for converting a binary information signal into an eight phase psk signal, said correlative phase modulator comprising:
   first encoder means responsive to said binary information signal for generating one of four possible quaternary signals during each of a plurality of successive time periods, the particular one of said four possible quaternary signals generated during each of said time periods being determined by said binary information signal;
   second encoder means responsive to said quaternary signals for generating one of eight possible octernary signals during each of said time periods, the particular one of said eight possible octernary signals generated during any given one of said time periods being determined by a predetermined law of correlation between the quaternary signals generated during two successive time periods, said second encoder means generating said octernary signals in such a manner that any of the eight possible octernary signals may be generated during each of said time periods;
   eight phase modulator means responsive to said octernary signals for eight-phase modulating a carrier signal as a function of said octernary signals.

2. A correlative phase modulator according to claim 1, wherein said second encoder means comprises:
   differential logic convertor means for converting said quaternary signals into differential signals in accordance with the following relationship:

$$S_i = P_i + S_{i-1} \pmod 4,$$

where $i$ represents an integer, $P_i$ represents the quaternary signal generated during the $i$-th time period, and $S_{i-1}$ and $S_i$ represent the differential quaternary signals generated during the $(i-1)$-th and -th time periods, respectively; and
   a correlative encoder for converting said differential quaternary signals into a sequence of octernary signals in compliance with said predetermine law of correlation.

3. A correlative phase modulator in accordance with claim 2, wherein said 8-phase modulator means comprises:
   an 8-phase modulator;
   means for supplying a carrier signal to said 8-phase modulator, said 8-phase modulator being capable of producing an 8-phase psk signal in response to said octernary signal.

4. A correlative phase modulator for converting a binary information signal into a 5-phase psk signal, comprising:
   first encoder means responsive to said binary information signal for generating one of four possible quaternary signals during each of a plurality of time periods, the particular one of said four possible quaternary signals generated during each of said time periods being determined by said binary information signal.
   second encoder means responsive to said quarternary signals for generating one of five possible octernary signals during each of said time periods, the particular one of said five possible octernary signals generated during any given one of said time periods being determined by a predetermined law of correlation between the octernary signals generated during two successive time periods, said second encoder means generating said octernary signals in such a manner that any one of the five possible octernary signals may be generated during each of said time periods; and
   phase modulator means responsive to said octernary signals for 8-phase modulating a carrier signal as a function of said octernary signals.

5. A correlative phase modulator as claimed in claim 4, wherein said second encoder means comprises:
   correlative logic means for converting said quarternary signals into a sequence of octernary signals;
   adder means for converting said octernary signals into a sequence of octernary differential signals in accordance with the following relationship:

$$K_i = Q_i + K_{i-1} \pmod 8,$$

where $i$ represents an integer, $Q_i$ represents the quarternary code generated in the $i$-th time period, and $K_{i-1}$ and $K_i$ represent the differential octernary signals generated during the $(i-1)$-th and $i$-th time periods, respectively.

6. The correlative phase modulator of claim 5, wherein said phase modulator comprises:

an 8-phase modulator;

means for supplying a carrier signal to said 8-phase modulator, said 8-phase modulator being capable of producing an 8-phase modulating signal in accordance with said differential signals.

7. A correlative phase demodulator for converting an 8-phase psk signal into a binary information signal, said psk signal being of the type which may exhibit any one of eight possible phases during each of a plurality of successive time period, and correlative phase demodulator comprising:

8-phase demodulator means responsive to said 8-phase psk signal for generating one of eight possible octernary signals during each of said plurality of successive time periods, the particular one of said eight possible octernary signals generated during each of said time periods being determined by said psk signals;

first encoder means responsive to said octernary signals for generating one of four possible quarternary signals during each of said time periods, the particular one of said four possible quarternary signals generated during any given one of said time periods being determined by a predetermined law of correlation; and second encoder means responsive to said quarternary signals for generating a binary information signal.

8. A correlative phase demodulator according to claim 7, wherein said first encoder means comprises:

logic means for converting said octernary signals into differential quarternary signals in compliance with said predetermined law of correlation;

differential logic means for converting said differential quarternary signals into said quarternary signals.

9. A correlative differential phase demodulator according to claim 7, wherein said 4-phase demodulator means comprises and 4-phase demodulator for converting said 4-phase phase psk signal into quarternary differential codes and differential logic means for converting said quarternary differential codes into said quarternary codes.

10. A correlative phase demodulator for converting an 8-phase psk signal into a binary information signal, said 8-phase psk signal being of a type which permits any of said eight possible phases to occur in any of a plurality of predetermined time periods, said correlative phase demodulator comprising:

frequency doubler means for converting said 8-phase psk signal into a 4-phase psk signal;

4-phase demodulator means for converting said 4-phase psk signal into a series of quarternary signals, one said quarternary signal being generated during each of said predetermined time periods.

* * * * *